(12) United States Patent
Walter

(10) Patent No.: US 11,105,136 B2
(45) Date of Patent: Aug. 31, 2021

(54) REGULATING VALVE

(71) Applicant: GEZE GmbH, Leonberg (DE)

(72) Inventor: Ingo Walter, Stuttgart (DE)

(73) Assignee: GEZE GMBH, Leonberg (DE)

( * ) Notice: Subject to any disclaimer, the term of this patent is extended or adjusted under 35 U.S.C. 154(b) by 108 days.

(21) Appl. No.: 16/450,095

(22) Filed: Jun. 24, 2019

(65) Prior Publication Data
US 2019/0390497 A1    Dec. 26, 2019

(30) Foreign Application Priority Data

Jun. 25, 2018 (DE) ...................... 10 2018 210 277.5

(51) Int. Cl.
*E05F 3/12*     (2006.01)
*F16K 17/04*    (2006.01)
(Continued)

(52) U.S. Cl.
CPC .............. *E05F 3/12* (2013.01); *E05F 3/223* (2013.01); *F16K 17/046* (2013.01); *F16K 17/06* (2013.01); *F16K 17/30* (2013.01); *E05Y 2900/132* (2013.01); *E05Y 2900/148* (2013.01); *E05Y 2900/40* (2013.01)

(58) Field of Classification Search
CPC ..... E05F 3/12; E05F 3/10; E05F 3/102; E05F 3/104; E05F 3/223; E05F 15/50; E05F 15/53; F16K 17/046; F16K 17/06; F16K 17/30; E05Y 2900/132; E05Y 2900/148; E05Y 2900/40; Y10T 16/27; Y10T 16/276; Y10T 16/2766; Y10T 16/2777; Y10T 16/56; Y10T 16/593

USPC ........ 16/49, 51, 52, 56, 58, 71, 72; 137/538, 137/540
See application file for complete search history.

(56) References Cited

U.S. PATENT DOCUMENTS 3,574,886 A * 4/1971 Solovieff .................. E05F 3/12
  16/51
4,161,189 A * 7/1979 Mueller, Jr. ............ F16K 17/04
  137/514.7
(Continued)

FOREIGN PATENT DOCUMENTS

DE    9203873 U1    9/1992
DE    10325202 A1   1/2005
(Continued)

OTHER PUBLICATIONS

Combined Search and Examination Report issued in connection with UK Application No. GB1908631.3 dated Dec. 18, 2019.

*Primary Examiner* — William L Miller
(74) *Attorney, Agent, or Firm* — Steven M. Shape; Dennemeyer & Associates, LLC

(57) ABSTRACT

A regulating valve for activating a strike function of a hydraulic door, gate, or window drive, in particular a hydraulic door closer, which is arranged in a hydraulic channel via which hydraulic fluid can flow, comprises a valve member which is axially displaceable in a valve bore between a closed position and an open position, is acted on in an opening direction by a spring unit, is acted on by the pressure in a pressure chamber in the closing direction and can be transferred into the open position thereof by the spring force of the spring unit when there is a drop in pressure in the pressure chamber below a predeterminable limit pressure.

14 Claims, 2 Drawing Sheets

(51) Int. Cl.
*F16K 17/06* (2006.01)
*F16K 17/30* (2006.01)
*E05F 3/22* (2006.01)

(56) References Cited

U.S. PATENT DOCUMENTS

| | | | | |
|---|---|---|---|---|
| 4,378,612 | A * | 4/1983 | Beers | E05F 3/12 16/49 |
| 4,386,446 | A * | 6/1983 | Zunkel | E05F 3/12 16/58 |
| 4,657,043 | A * | 4/1987 | Ampferer | F01M 1/16 137/538 |
| 4,682,531 | A * | 7/1987 | Mayer | F15B 13/02 137/514.5 |
| 5,502,874 | A * | 4/1996 | Lucas | E05F 3/102 16/52 |
| 5,687,451 | A * | 11/1997 | Singer | E05F 3/12 16/58 |
| 6,493,904 | B1 * | 12/2002 | Chiang | E05F 3/104 16/56 |
| 6,736,161 | B2 * | 5/2004 | Kjellander | F16K 17/0433 137/454.5 |
| 2010/0024158 | A1 * | 2/2010 | Winkler | A61P 1/00 16/51 |
| 2010/0024303 | A1 * | 2/2010 | Wulbrandt | E05F 3/12 49/70 |
| 2010/0176329 | A1 * | 7/2010 | Meulenbeld | E05F 3/12 251/366 |
| 2010/0192325 | A1 * | 8/2010 | Hufen | E05F 3/12 16/71 |
| 2019/0383080 | A1 * | 12/2019 | Barbon | E05F 3/102 |
| 2019/0390498 | A1 * | 12/2019 | Worner | E05F 3/102 |
| 2020/0256108 | A1 * | 8/2020 | Shetty | E05F 3/102 |

FOREIGN PATENT DOCUMENTS

| | | |
|---|---|---|
| EP | 2397638 A2 | 12/2011 |
| EP | 3421847 A1 | 1/2019 |
| KR | 1020070120931 A | 12/2007 |

* cited by examiner

REGULATING VALVE

CROSS-REFERENCE TO RELATED APPLICATIONS

This application claims priority to German application 102018210277.5, filed Jun. 25, 2018, which is hereby incorporated by reference in its entirety.

BACKGROUND OF THE INVENTION

The invention relates to a regulating valve for activating a strike function of a hydraulic door, gate or window drive, in particular a hydraulic door closer. It further relates to a hydraulic door, gate or window drive, in particular hydraulic door closer, having such a regulating valve.

Hydraulic door closers are well known and cause the independent closing of a door, wherein both the movement of the door leaf in the door frame and the dropping of the latch of the door lock into the lock plate are ensured. A closing which is as controlled as possible should be ensured in each case. Such a door closer usually comprises an axle, a piston connected via a transmission to the axis and guided in a housing and at least one spring interacting with the piston, wherein a pressure chamber or a non-pressurised chamber are provided on opposite sides of the piston, and hydraulic fluid can be transferred via at least one regulating valve from the pressure chamber into the non-pressurised chamber during a closing process. During manual or, for example, automatic opening of the wing caused by a hydraulic pump, the spring arranged in the housing filled with hydraulic fluid is compressed by displacing the piston so that the spring can be used as an energy store for independent closing of the wing. Between the spaces of the housing which are separated from one another by the piston, hydraulic channels having associated regulating valves are arranged, via which the overflow of the hydraulic fluid for controlling the drive behaviour can be influenced.

In hydraulically damped door closers, the pressurised hydraulic fluid is throttled by means of one or more regulating valves. The strike function of such a hydraulically damped door closer enables an undamped closure of the door during the activation thereof by short-circuiting the damping circuit. This so-called strike region is also often adjustable by a regulating valve, i.e. is also throttled again.

A disadvantage of previously known hydraulically damped door closers in particular is that the strike function can only be set rigidly, for example during commissioning. Randomly occurring obstacles on the door cannot be overcome if the strike is deactivated. On the other hand, if the strike is set to wind load, the door starts to strike loudly without wind load.

The aim of the invention is to provide a regulating valve and a hydraulic door, gate or window drive of the type in question by which the aforementioned disadvantages are eliminated. In particular, the aim is to ensure an activation of the strike function of a door, gate or window drive that is variable and optimally adaptable to the circumstances.

This aim is achieved according to the invention by a regulating valve having the features of claim 1 and a hydraulic door, gate or window drive having the features of claim 12. Preferred embodiments of the regulating valve according to the invention and the hydraulic door, gate or window drive according to the invention arise from the dependent claims, the present description and the drawings.

The regulating valve according to the invention for activating a strike function of a hydraulic door, gate, or window drive, in particular a hydraulic door closer, is arranged in a hydraulic channel, via which the hydraulic fluid can flow to effect the strike function, in particular in a channel for short-circuiting a damping circuit. It comprises a valve member which is axially displaceable in a valve bore between a closed position and an open position, is acted on in an opening direction by a spring unit, is acted on by the pressure in a pressure chamber in the closing direction and can be transferred into the open position thereof by the spring force of the spring unit when there is a drop in pressure in the pressure chamber below a predeterminable limit pressure.

If the pressure in the pressure chamber of the regulating valve is at least substantially proportional to or representative of the pressure in the pressure chamber of the door, gate or window drive, for example by being connected thereto or being formed thereby, the pressure upstream of the piston of the hydraulic door, gate or window drive and thus the relevant state of said drive can be detected by the regulating valve according to the invention. The regulating valve according to the invention can thus also be referred to as a sensor valve. The regulating valve according to the invention also activates or deactivates the strike function according to the state of the drive. The principle underlying the solution according to the invention is based on the fact that the pressure upstream of the piston of the drive and therefore the pressure upstream of the relevant regulating valve decrease as soon as the wing is externally decelerated or braked. The safety valve according to the invention detects this condition and activates the strike function of the hydraulic drive. The relevant wing now even closes under unexpectedly occurring resistances such as, for example, a stiff latch, sporadically occurring wind that is not too strong and/or lock situations with an air cushion to be overcome. The solution according to the invention thus ensures in particular a more variable activation of the strike function of a door, gate or window drive which can be optimally adapted to the conditions.

Preferably, the valve member comprises a gate valve which is axially adjustable in the valve bore. Such a gate valve is a relatively robust, reliable valve member.

According to an expedient practical embodiment of the regulating valve according to the invention, the valve member is provided on a pressure piece which is axially displaceable in the valve bore and is acted on by the spring unit on the one side and on the other side by the pressure in the pressure chamber. In this case, when the pressure in the pressure chamber drops, the valve member can be transferred into its open position via the pressure piece that is acted on by the spring unit. When the pressure in the pressure chamber increases again, the valve member is transferred into the closed position via the pressure piece and the spring unit is tensioned again.

Advantageously, the limit pressure is variably adjustable in particular via the force of the spring unit acting on the valve member in the opening direction. In this case, preferably the limit pressure or the force of the spring unit acting on the valve member in the opening direction is variably adjustable via an adjusting piece which is axially adjustable in the valve bore. Of particular advantage here is when the adjusting piece is axially adjustable via a thread in the valve bore, as a result of which an exact adjustment of the desired limit pressure is possible.

The spring unit acting on the valve member is expediently provided axially between the pressure piece and the adjusting piece. For a construction which is as compact as possible, the spring unit can be at least partially slid onto the pressure piece and supported on a collar provided on the pressure piece or the like.

A drain opening for the hydraulic fluid can preferably be closed or released by the valve member.

In this case, the pressure piece is preferably provided with an overflow channel for the hydraulic fluid, which opens at one end into the pressure chamber and is provided in the region of the other end thereof with a branch, which, when the pressure piece assumes the closed position thereof and the valve member, accordingly, assumes the closed position thereof, opens at a greater axial distance from the drain opening than when the pressure piece assumes the open position thereof and the valve member, accordingly, assumes the open position thereof.

According to an expedient practical embodiment of the regulating valve according to the invention, the valve bore has a smaller cross section in the displacement region of the valve member and in the region of the pressure chamber than in its remaining region.

It is particularly advantageous if the branch of the overflow channel opens at least substantially in the region of the valve bore of relatively larger cross section when the pressure piece assumes the closed position thereof and, accordingly, the valve member assumes the closed position thereof, and, when the pressure piece assumes the open position thereof and, accordingly, the valve member assumes the open position thereof, opens at least substantially in the region of the valve bore of relatively smaller cross section.

The hydraulic door, gate or window drive according to the invention, in particular hydraulic door closer, comprises a housing, a piston displaceably guided in the housing and hydraulic channels which are provided in the housing and through which hydraulic medium can flow. In this case, according to the invention, a regulating valve according to the invention is arranged in at least one hydraulic channel via which hydraulic fluid can flow to effect a strike function.

According to a preferred practical embodiment of the hydraulic door, gate or window drive according to the invention, a pressure chamber is provided on one side of the piston of the door, gate or window drive and on the other side thereof a non-pressurised chamber is provided, and the pressure in the pressure chamber of the regulating valve is at least substantially equal to the pressure in the pressure chamber of the door, gate or window drive or at least substantially proportional to or representative of the pressure in the pressure chamber of the door, gate or window drive.

Advantageously, the pressure chamber of the window valve is connected to the pressure chamber of the door, gate or window drive. According to an alternative advantageous embodiment, the pressure chamber of the regulating valve can also be formed by the pressure chamber of the door, gate or window drive.

BRIEF DESCRIPTION OF THE DRAWINGS

The invention is explained in more detail below on the basis of an exemplary embodiment with reference to the drawings.

DETAILED DESCRIPTION OF THE INVENTION

Figure 1:
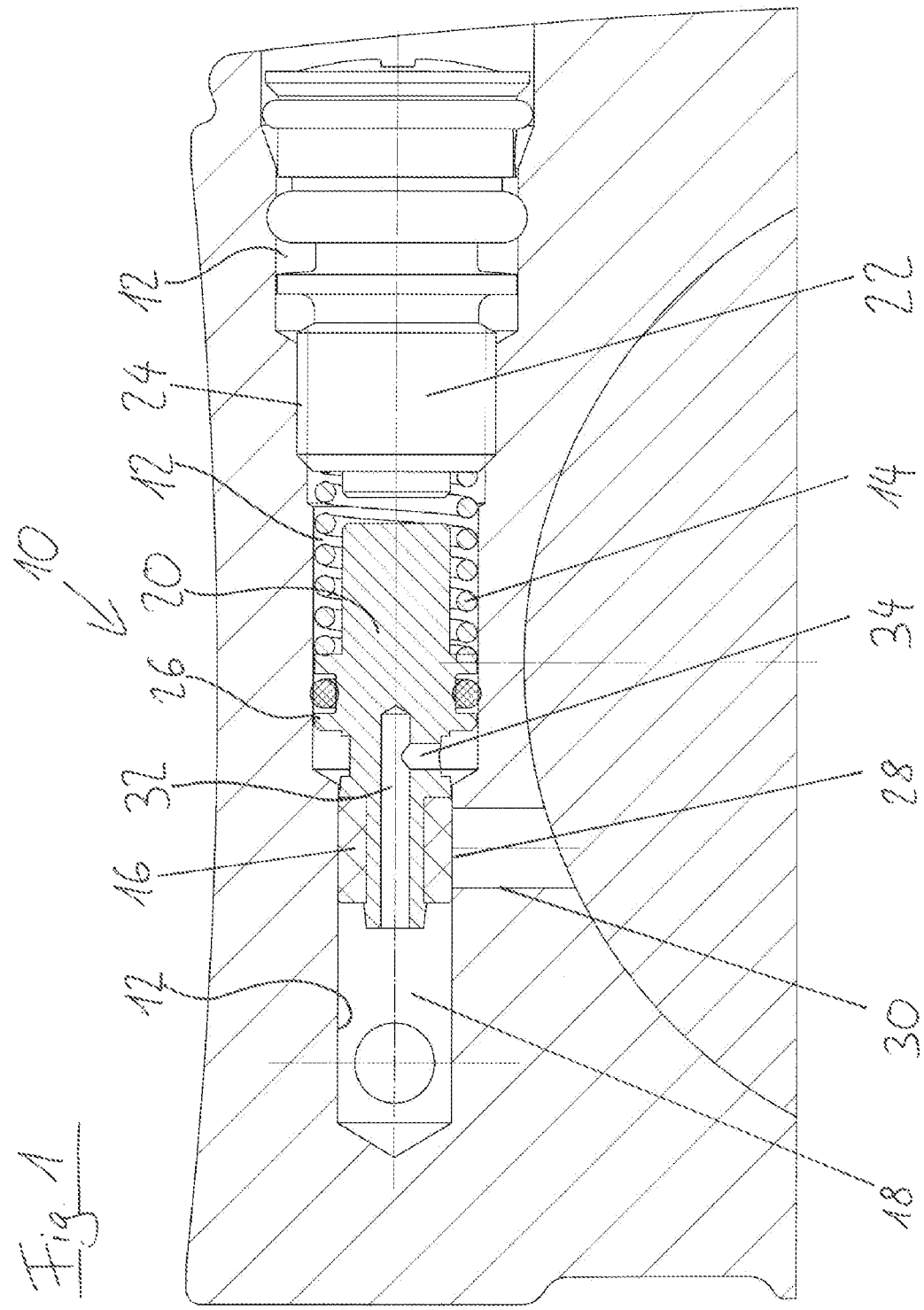
FIG. 1 shows a schematic longitudinal sectional view of an exemplary embodiment of a regulating valve according to the invention, wherein the regulating valve is closed so that the relevant wing can close without interference.
Figure 2:
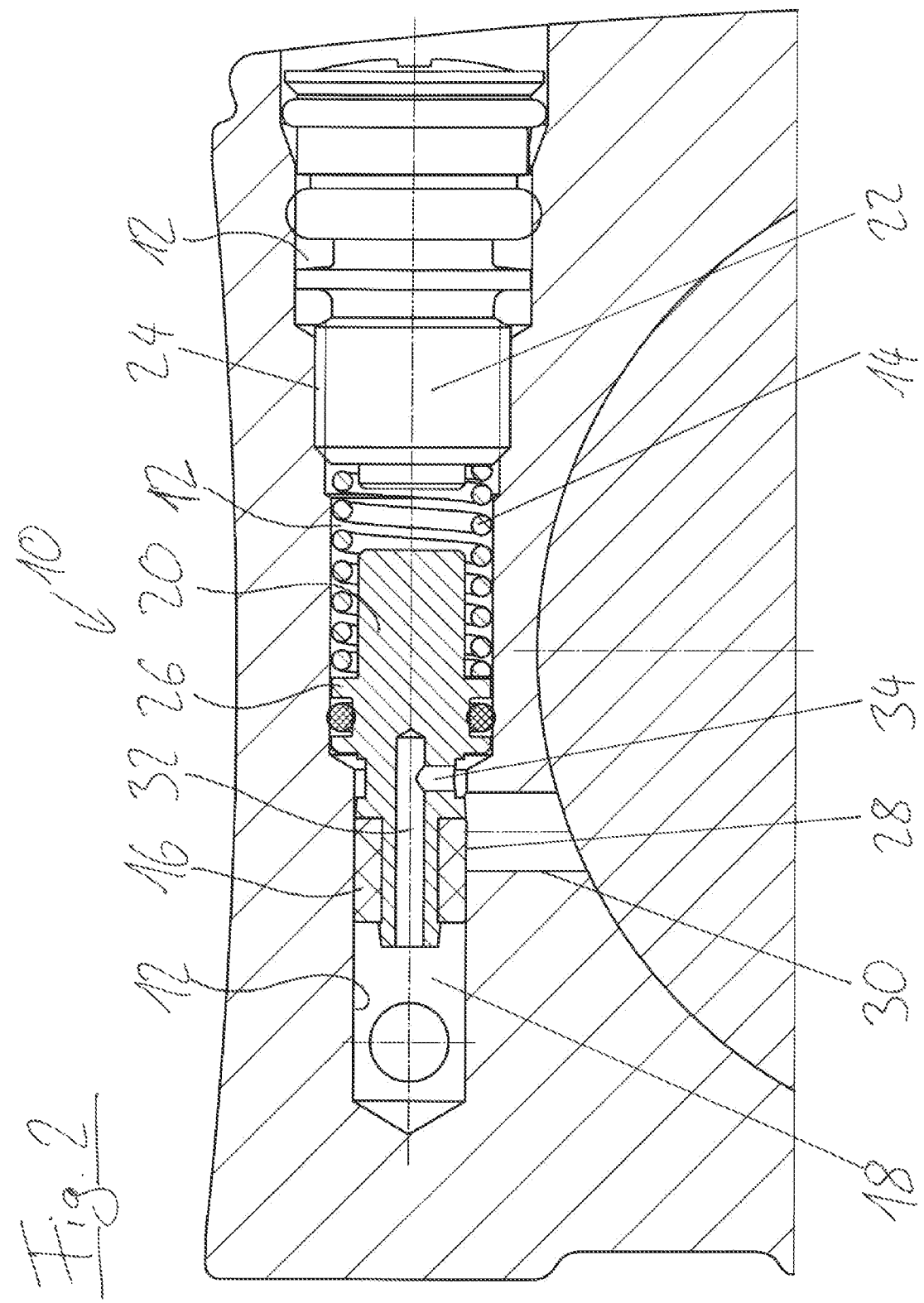
FIG. 2 shows a schematic longitudinal sectional view of the regulating valve according to FIG. 1, wherein the regulating valve, however, is open after the wing has been stopped or obstructed.

FIGS. 1 and 2 show a schematic representation of an exemplary embodiment of a regulating valve 10 according to the invention for activating a strike function of a hydraulic door, gate or window drive. In this case, the regulating valve 10 can be provided in particular for activating a strike function of a hydraulic door closer.

The regulating valve 10 is arranged in a hydraulic channel via which hydraulic fluid can flow to effect a strike function, particularly in a channel for short-circuiting a damping circuit. It comprises a valve member 16 which is axially displaceable in a valve bore 12 between a closed position (see FIG. 1) and an open position (see FIG. 2), is acted on by a spring unit 14 in the opening direction, is acted on by the pressure in a pressure chamber 18 in the closing direction and, when there is a drop in pressure in the pressure chamber 18 below a predeterminable limit pressure, can be transferred into the open position thereof by the spring force of the spring unit 14.

In the present case, the valve member 16 includes, for example, an axially adjustable gate valve in the valve bore 12.

In addition, in the illustrated exemplary embodiment, the valve member 16 is provided on a pressure piece 20 which is axially displaceable in the valve bore 12, is acted on by the spring unit 14 on the one side and acted on by the pressure in the pressure chamber 18 on the other side.

The limit pressure is variably adjustable in particular via the force of the spring unit 14 acting upon the valve member 16 in the opening direction.

In this case, the limit pressure or the force of the spring unit 14 acting on the valve member 16 in the opening direction is variably adjustable, for example, via an axially adjustable adjusting piece 22 in the valve bore 12. In the present exemplary embodiment, this adjusting piece 22 is axially adjustable in the valve bore 12 via a thread 24.

As can be seen from FIGS. 1 and 2, the spring unit 14 acting on the valve member 16 can be provided axially between the pressure piece 20 and the adjusting piece 22, wherein it is slid in the present case to a large extent onto the pressure piece 20 and supported on an annular shoulder 26 of the pressure piece 20 so as to provide a correspondingly compact structure.

A drain opening 28 to a drain channel 30 for the hydraulic fluid can be closed or released by the valve member 16.

As shown, the pressure piece 20 can be provided with an overflow channel 32 for the hydraulic fluid, which opens at one end into the pressure chamber 18 and is provided in the region of the other end thereof with a branch 34, which, when the pressure piece 20 assumes the closed position thereof and, accordingly, the valve member 16 assumes the closed position thereof (see FIG. 1), opens at a greater axial distance from the drain opening 28 than when the pressure piece 20 assumes the open position thereof and, accordingly, the valve member 16 assumes the open position thereof (see FIG. 2).

As can likewise be seen from FIGS. 1 and 2, the valve bore 12 in the present case has a smaller cross section in the displacement region of the valve member 16 and in the region of the pressure chamber 18 than in the remaining region thereof.

In the present exemplary embodiment, in addition, the branch 34 of the overflow channel 32, when the pressure piece 20 assumes the closed position thereof and, accordingly, the valve member 16 assumes the closed position thereof (see FIG. 1), opens at least substantially in the region of the valve bore 12 of relatively larger cross section, and, when the pressure piece 20 assumes the open position thereof and, accordingly, the valve member 16 assumes the open position thereof (see FIG. 2), opens at least substantially in the region of the valve bore 12 of relatively smaller cross section.

A regulating valve 10 according to FIGS. 1 and 2 can be used, for example, in a hydraulic door, gate or window drive, in particular a hydraulic door closer. Such a hydraulic drive comprises, for example, a housing, a piston displaceably guided in the housing and hydraulic channels which are provided in the housing and through which hydraulic medium can flow. A regulating valve 10 according to the invention can be arranged in at least one hydraulic channel of such a drive via which the hydraulic fluid can flow to effect a strike function, as described, for example, in relation to FIGS. 1 and 2.

Thus, a pressure chamber can be provided on one side of the piston of such a door, gate or window drive, and a non-pressurised chamber can be provided on the other side thereof, and the pressure in the pressure chamber 18 of the regulating valve 10 can be at least substantially equal to the pressure in the pressure chamber of the door, gate or window drive, or at least substantially proportional to or representative of the pressure in the pressure chamber of the door, gate or window drive. A pressure drop or pressure increase in the pressure chamber of the door, gate or window drive can thus be detected accordingly by the regulating valve 10 to activate the strike function according thereto if necessary.

The pressure chamber 18 of the regulating valve 10 can, for example, be connected to the pressure chamber of the door, gate or window drive or be formed thereby.

LIST OF REFERENCE SIGNS

10 Regulating valve
12 Valve bore
14 Spring unit
16 Valve member
18 Pressure chamber
20 Pressure piece
22 Adjusting piece
24 Threads
26 Annular shoulder
28 Drainage opening
30 Drainage channel
32 Overflow channel
34 Branch

The invention claimed is:

1. A regulating valve (10) for activating a strike function of a hydraulic door, gate or window drive, wherein the regulating valve (10) is arranged in a hydraulic channel via which hydraulic fluid flows to effect the strike function, and a valve member (16) which is axially displaceable between a closed position and an open position in a valve bore (12), is acted on by a spring unit (14) in an opening direction, is acted on by a pressure in a pressure chamber (18) in a closing direction and is transferred into the open position thereof by a spring force of the spring unit (14) when there is a drop in the pressure in the pressure chamber (18) below a predetermined limit pressure, wherein the valve member (16) is provided on a pressure piece (20) which is axially displaceable in the valve bore (12) and on which the spring unit (14) acts on a first side of the pressure piece (20) and the pressure in the pressure chamber (18) acts on a second side of the pressure piece (20).

2. The regulating valve according to claim 1, wherein the valve member (16) comprises an axially adjustable gate valve in the valve bore (12).

3. The regulating valve according to claim 1, wherein the limit pressure is variably adjustable via the force of the spring unit (14) acting on the valve member (16) in the opening direction.

4. The regulating valve according to claim 3, wherein the limit pressure or the force of the spring unit acting on the (14) valve member (16) in the opening direction is variably adjustable via an axially adjustable adjusting piece (22) in the valve bore (12).

5. The regulating valve according to claim 4, wherein the adjusting piece (22) is axially adjustable via a thread (24) in the valve bore (12).

6. The regulating valve according to claim 1, wherein the spring unit (14) acting on the valve member (16) is provided axially between the pressure piece (20) and an adjusting piece (22).

7. The regulating valve according to claim 1, wherein a drainage opening (28) for the hydraulic fluid is closed or released by the valve member (16).

8. The regulating valve according to claim 7, wherein the pressure piece (20) is provided with an overflow channel (32) for the hydraulic fluid, the overflow channel (32) opens at a first end into the pressure chamber (18) and is provided in a region of a second end thereof with a branch (34), which, when the pressure piece (20) assumes the closed position thereof and the valve member (16), accordingly, assumes the closed position thereof, opens at a greater axial distance from the drain opening (28) than when the pressure piece (20) assumes the open position thereof and the valve member (16), accordingly, assumes the open position thereof.

9. The regulating valve according to claim 1, wherein the valve bore (12) in a displacement region of the valve member (16) and in a region of the pressure chamber (18) has a smaller cross section than in the remaining region thereof.

10. The regulating valve according to claim 1, further comprising a branch (34) of an overflow channel (32), when the pressure piece (20) assumes the closed position thereof and, accordingly, the valve member (16) assumes the closed position thereof, opens at least substantially in a region of the valve bore (12) of relatively larger cross section, and, when the pressure piece (20) assumes the open position thereof and, accordingly, the valve member (16) assumes the open position thereof, opens at least substantially in the region of the valve bore (12) of relatively smaller cross section.

11. The hydraulic door, gate, or window drive, comprising the regulating valve (10) of claim 1, having a housing, a piston displaceably guided in the housing, and hydraulic channels which are provided in the housing and through which hydraulic medium flows, wherein the regulating valve (10) is arranged in at least one of the hydraulic channels via which the hydraulic fluid flows to effect the strike function.

12. The hydraulic door, gate, or window drive according to claim 11, wherein a pressure chamber is provided on a first side of the piston of the door, gate or window drive and a non-pressurized chamber is provided on a second side thereof, and the pressure in the pressure chamber (18) of the regulating valve (10) is at least substantially equal to the pressure in the pressure chamber of the door, gate or window drive or at least substantially proportional to or representative of the pressure in the pressure chamber of the door, gate or window drive.

13. The hydraulic door, gate, or window drive according to claim 12, wherein the pressure chamber (18) of the regulating valve (10) is connected to the pressure chamber of the door, gate or window drive.

14. The hydraulic door, gate, or window drive according to claim 12, wherein the pressure chamber (18) of the regulating valve (10) is formed by the pressure chamber of the door, gate, or window drive.

* * * * *